C. B. MORSE.
Ring Spinning Frame.
No. 6,348. Reissued March 23, 1875.
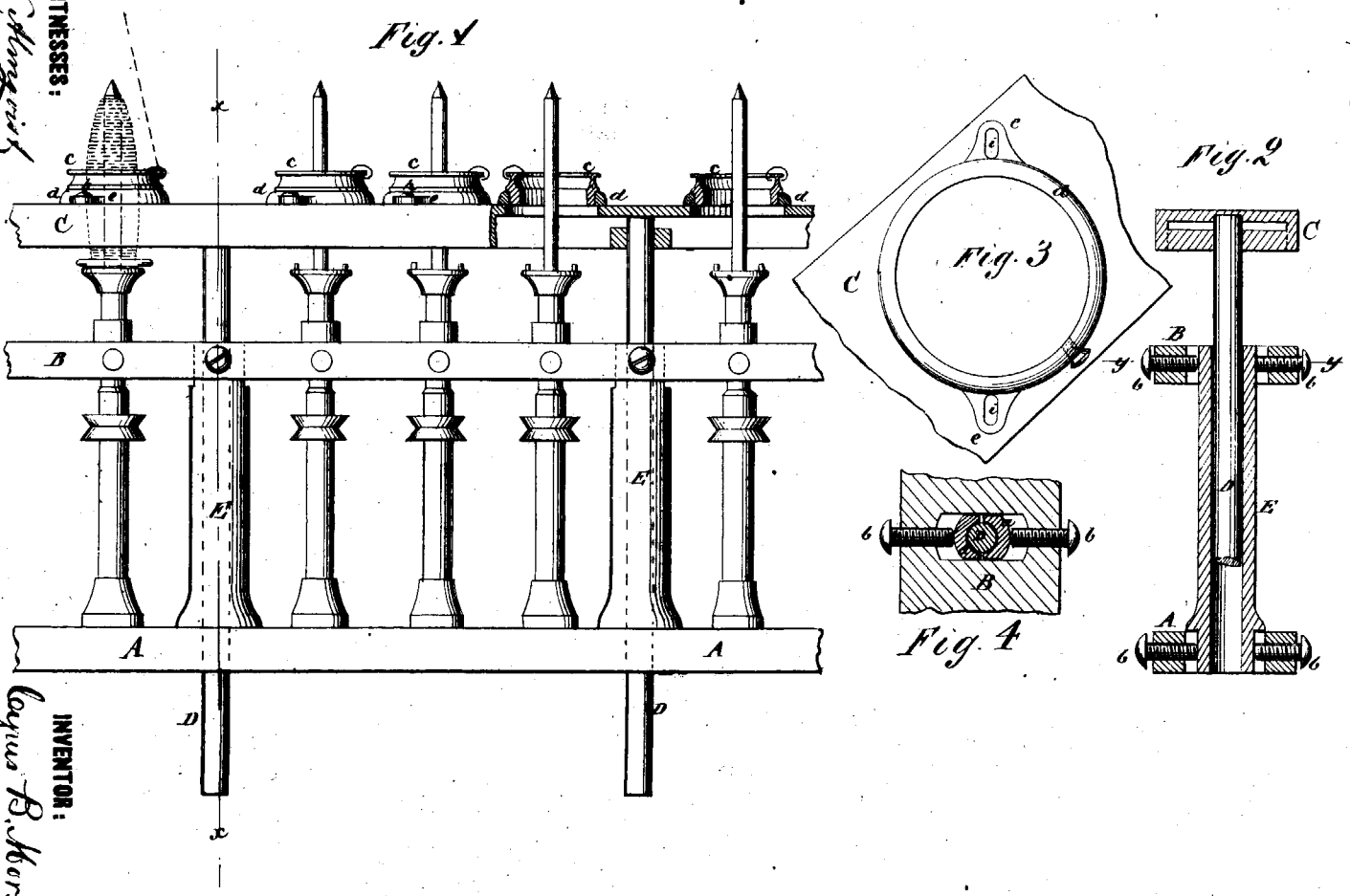
WITNESSES:
A. W. Almquist
A. F. Terry
INVENTOR:
Cyrus B. Morse
BY
ATTORNEYS.
THE GRAPHIC CO. PHOTO-LITH. 39 & 41 PARK PLACE, N.Y.

UNITED STATES PATENT OFFICE.

CYRUS B. MORSE, OF RHINEBECK, NEW YORK.

IMPROVEMENT IN RING SPINNING-FRAMES.

Specification forming part of Letters Patent No. 76,798, dated April 14, 1868; reissue No. 6,348, dated March 23, 1875; application filed January 18, 1875.

*To all whom it may concern:*

Be it known that I, CYRUS B. MORSE, of Rhinebeck, in the county of Dutchess and State of New York, have invented a new and useful Improvement in Rails for Ring-Spinning, of which the following is a specification:

Figure 1 represents a front view of a section of rails for ring-spinning. Fig. 2 is a cross-section of the rails through the lifting-rail support in the line *x x*, Fig. 1, showing my improved tubular lifting-rod support. Fig. 3 is a top view of a portion of the lifting-rail, showing my improved ring-holder. Fig. 4 is a horizontal section through the bolster-rails, in the line *y y*, Fig. 2, showing the arrangement of my improved adjustable ring-rails.

Similar letters of reference indicate corresponding parts.

This invention relates to new and useful improvements in the construction of frames for ring-spinning and their connected parts, which consist, first, in a device for adjusting the lifting-rail by means of set-screws moving the position of the lifting-rod in or out, above or below, in transverse slots in the bolster and step-rails; and, secondly, in a ring-holder, placed above the ring-rail, and made adjustable, as hereinafter described.

A represents the bottom or step rail of a ring spinning-frame; B, the bolster-rail, and C the lifting-rail. The lifting-rods D D have hitherto been set in bushings in the step and bolster rails without the means of adjustment, and they have been subjected to uneven wear at the two points above and below in passing through each rail, giving a taper form in consequence of the irregular friction produced by the varying motion of the lifting-rod at different stages of winding the yarn on the cop. This defect in the wear of the lifting-rods at two points has caused much difficulty in the operation of ring-spinning.

To remedy the defect I have constructed a tubular lifting-rod support, E, split longitudinally into two equal parts, *a a*, extending from the bolster to the step-rail, within which tube the lifting-rod is fitted exactly, as is a piston, so that the surface has an equal bearing the whole length of its movement, and this wears evenly from top to bottom, and never gets out of true, as shown clearly in Fig. 2.

The tubular lifting-rod support E is held in place by two set-screws, *b b*, on opposite sides of each rail, which screws bear against the sides of the ends placed in transverse slots in the rails, as shown in Figs. 2 and 4. By means of these screws the lifting-rail can be adjusted precisely as the spindles may require from time to time, in consequence of displacement out of line by the drawing pressure of the pulley-belts toward the cylinders of the spindles.

Instead of the ordinary method of securing the rings *c c* in the lifting-rail with side screws, I place them in holders *d d*, which are secured upon the rail, and arranged so as to be adjustable for centering the ring perfectly with the spindles. The holder *d* is a ring-band, within which the ring *c* is set. On opposite sides are two lugs or ears, *e e*, which are slotted with slots *i i*, Fig. 3, wider than the tightening-screws *h*, which pass through them to fasten the ring-holder firmly to the top of the rail. By means of these slots in the ears of the ring-holder the ring-holder can be adjusted on the rail in any direction by the screws, so as to center the ring exactly upon the spindle.

To do this is the work of a moment only, by means of a centering-block slipped over the spindle, and setting the ring true around it before screwing up the ring-holder fast upon the rail.

I am aware that a continuous compound lifting and ring rail was made known to the public in 1834 in English patent No. 6,690, while in 1847 an improvement upon this in United States patent No. 5,378 shows a ring-holder with one slotted lug adjustable upon a separate lifting-rail, the series of holders forming a sectional ring-rail. The single lug for holding the ring in position has been found in practice to work out of center very soon, and thus to compel a frequent recentering of the ring at short intervals. Hence this device has been discarded, while after a lapse of twenty-one years I have invented the hereinafter-claimed improvement. Finding by experiment that the holder must be counterbraced on opposite sides of the spindle or ring, and that in the American patent No. 5,378 no more than a single lug or brace can be used, I dispense with its separate lifting and sectional ring-rail, taking the old continuous compound ring and lifting-rail of the English patent 6,690, and seating the holder on top of the rail. I then formed the holder with opposite and slotted lugs or flanges, the latter being placed adjustably with respect to the spindle on the rail.

What I claim is—

1. The combination of a continuous ring and lift rail, and a holder that holds the ring centered by two opposite slotted lugs or flanges and clamp-screws, as shown and described, for the purpose specified.

2. The tube E, in combination with the slotted rails A B and lifting-rod D, as and for the purpose specified.

CYRUS B. MORSE.

Witnesses:
JAMES T. GRAHAM,
ALEX. F. ROBERTS.